United States Patent
Kikuchi et al.

(10) Patent No.: US 10,233,259 B2
(45) Date of Patent: Mar. 19, 2019

(54) HYPROMELLOSE ACETATE SUCCINATE, METHOD FOR PRODUCING THE SAME AND COMPOSITION CONTAINING THE SAME

(71) Applicant: Shin-Etsu Chemical Co., Ltd., Chiyoda-ku, Tokyo (JP)

(72) Inventors: Kazuki Kikuchi, Joetsu (JP); Mitsuhiro Yoshida, Joetsu (JP); Junichi Matsubara, Joetsu (JP); Tatsuya Yamashita, Joetsu (JP); Akira Kitamura, Joetsu (JP); Naosuke Maruyama, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 15/853,164

(22) Filed: Dec. 22, 2017

(65) Prior Publication Data
US 2018/0118854 A1    May 3, 2018

Related U.S. Application Data

(62) Division of application No. 15/449,725, filed on Mar. 3, 2017, now Pat. No. 9,884,922.

(30) Foreign Application Priority Data

Mar. 11, 2016   (JP) ................. 2016-048254

(51) Int. Cl.
| | |
|---|---|
| C08B 13/00 | (2006.01) |
| C09D 7/20 | (2018.01) |
| C09D 101/32 | (2006.01) |
| C09D 7/65 | (2018.01) |

(52) U.S. Cl.
CPC ............... *C08B 13/00* (2013.01); *C09D 7/20* (2018.01); *C09D 7/65* (2018.01); *C09D 101/32* (2013.01)

(58) Field of Classification Search
None
See application file for complete search history.

(56) References Cited

U.S. PATENT DOCUMENTS 3,453,261 A * 7/1969 Scherff .................. C08B 11/02
                                                           106/172.1
9,040,033 B2    5/2015 Miller et al.

FOREIGN PATENT DOCUMENTS

EP          3091036 A1 * 11/2016 ............. C08B 11/20

OTHER PUBLICATIONS

Shin-Etsu Chemical Co., Ltd. "Hydroxypropyl Methylcellulose Acetate Succinate; Shin-Etsu AQOAT" *Brochure* (20 pages) (2013).

\* cited by examiner

*Primary Examiner* — Melvin C. Mayes
*Assistant Examiner* — Stefanie J Cohen
(74) *Attorney, Agent, or Firm* — Myers Bigel, P.A.

(57) ABSTRACT

Provided are hypromellose acetate succinate (HPMCAS) which exhibits high solubility and can suppress generation of undissolved materials when dissolved in a solvent; an HPMCAS-containing composition; and a method for producing the HPMCAS. More specifically, provided are HPMCAS having a ratio of 2-position MS to 3-position MS of 1.2 or less, wherein the 2-position MS means a molar substitution of hydroxypropyl group by which a hydrogen atom of a hydroxyl group on 2-position carbon of each glucose unit of the HPMCAS has been directly replaced, and the 3-position MS means a molar substitution of hydroxypropyl group by which a hydrogen atom of a hydroxyl group on 3-position carbon of each glucose unit of the HPMCAS has been directly replaced; a composition comprising the HPMCAS and a solvent; and the method for producing the HPMCAS.

1 Claim, No Drawings

HYPROMELLOSE ACETATE SUCCINATE, METHOD FOR PRODUCING THE SAME AND COMPOSITION CONTAINING THE SAME

RELATED APPLICATIONS

This application is a divisional of U.S. patent application Ser. No. 15/449,725, now U.S. Pat. No. 9,884,922, filed Mar. 3, 2017, which claims priority from Japanese Patent Application No. 2016-048254, filed Mar. 11, 2016, the disclosure of each of which is incorporated by reference herein in its entirety.

FIELD OF THE INVENTION

The present invention relates to hypromellose acetate succinate, a method for producing the hypromellose acetate succinate, and a composition containing the hypromellose acetate succinate.

BACKGROUND

Enteric coating material hypromellose acetate succinate, which may hereinafter be also called "HPMCAS", has been widely used for the applications including a coating application, an application of controlled drug release, and an application of producing a solid dispersion containing the HPMCAS and a poorly water-soluble drug through hot melt extrusion or spray drying.

When HPMCAS is used for coating, a variety of coating methods can be applied. Examples include coating of a solution obtained by dissolving HPMCAS in an organic solvent, aqueous dispersion coating of an aqueous dispersion obtained by dispersing fine granules of HPMCAS in water in the presence of a plasticizer, alkali-neutralized aqueous coating of HPMCAS partially neutralized with an aqueous alkali solution, and dry coating in which fine particles of HPMCAS are directly applied while spraying a plasticizer.

HPMCAS is a polymer obtained by replacing the hydrogen atoms of the hydroxyl group of its glucose units forming a cellulose backbone with four kinds of substituents in total, wherein the two kinds of substituents are a methyl group ($-CH_3$) and a hydroxypropoxy group ($-C_3H_6OH$) for ether structures and the other two kinds of substituents are an acetyl group ($-COCH_3$) and a succinyl group ($-COC_2H_4COOH$) for ester structures (refer to a brochure by Shin-Etsu Chemical Co., Ltd. titled "Hydroxypropyl methyl cellulose acetate succinate Shin-Etsu AQOAT".).

SUMMARY OF THE INVENTION

It is the common practice to filter out undissolved materials from a composition having HPMCAS dissolved therein. When the amount of the undissolved materials is large, however, filter clogging occurs. Even when a filter is not used, a nozzle used during coating may be clogged therewith. Thus, improvement of conventional HPMCAS is required to further enhance solubility.

With the foregoing in view, the invention has been made. An object of the invention is to provide HPMCAS which exhibits high solubility and can suppress generation of undissolved materials when it is dissolved in a solvent; a method for producing the HPMCAS; and a composition comprising the HPMCAS.

The present inventors have proceeded with an extensive investigation with a view to achieving the above-described object. As a result, paying attention to the distribution of hydroxypropyl groups among the four substituents of HPMCAS, they have found that solubility of the HPMCAS in a solvent can be improved when a ratio of 2-position MS to 3-position MS falls within a predetermined range, wherein the 2-position MS means a molar substitution of hydroxypropyl group by which a hydrogen atom of a hydroxyl group on 2-position carbon of each glucose unit of the HPMCAS has been directly replaced and the 3-position MS means a molar substitution of hydroxypropyl group by which a hydrogen atom of a hydroxyl group on 3-position carbon of each glucose unit of the HPMCAS has been directly replaced; and have completed the invention.

In one aspect of the invention, there is provided hypromellose acetate succinate having a ratio of 2-position MS to 3-position MS of 1.2 or less, wherein the 2-position MS means a molar substitution of hydroxypropyl group by which a hydrogen atom of a hydroxyl group on 2-position carbon of each glucose unit of the hypromellose acetate succinate has been directly replaced, and the 3-position MS means a molar substitution of hydroxypropyl group by which a hydrogen atom of a hydroxyl group on 3-position carbon of each glucose unit of the hypromellose acetate succinate has been directly replaced.

In another aspect of the invention, there is provided a composition comprising the hypromellose acetate succinate and a solvent.

In a further aspect of the invention, there is provided a method for producing hypromellose acetate succinate comprising the steps of: reacting pulp with an alkali to obtain alkali cellulose; reacting the alkali cellulose with a methyl etherifying agent and a hydroxypropyl etherifying agent to obtain hydroxypropyl methyl cellulose in such a manner that a reaction ratio of the hydroxypropyl etherifying agent is 40% or less at the time when a reaction ratio of the methyl etherifying agent is 30%, or the reaction ratio of the hydroxypropyl etherifying agent is 90% or less at the time when the reaction ratio of the methyl etherifying agent is 50%; and reacting the hydroxypropyl methyl cellulose with acetic anhydride and succinic anhydride to obtain hypromellose acetate succinate having a ratio of 2-position MS to 3-position MS of 1.2 or less, wherein the 2-position MS means a molar substitution of hydroxypropyl group by which a hydrogen atom of a hydroxyl group on 2-position carbon of each glucose unit of the hypromellose acetate succinate has been directly replaced, and the 3-position MS means a molar substitution of hydroxypropyl group by which a hydrogen atom of a hydroxyl group on 3-position carbon of each glucose unit of the hypromellose acetate succinate has been directly replaced.

According to the present invention, the HPMCAS exhibits improved solubility when dissolved in a solvent, and clogging of a filter used for filtering out undissolved materials is reduced.

DETAILED DESCRIPTION OF EXAMPLE EMBODIMENTS

The invention will hereinafter be described more specifically.

According to the invention, the HPMCAS has a ratio of 2-position MS to 3-position MS of 1.2 or less, preferably 1.0 or less, more preferably 0.8 or less. The 2-position MS means a molar substitution of hydroxypropyl group by which the hydrogen atom of the hydroxyl group on the 2-position carbon of each glucose unit of the HPMCAS has been directly replaced. The 3-position MS means a molar substitution of hydroxypropyl group by which the hydrogen atom of the hydroxyl group on the 3-position carbon of each glucose unit of HPMCAS has been directly replaced. When the ratio of (2-position MS)/(3-position MS) is greater than 1.2, undissolved and semi-dissolved materials remain after the HPMCAS is dissolved in a solvent, so that clogging of a filter or a nozzle is caused. The lower limit of the ratio of the 2-position MS to 3-position MS is not particularly limited. The lower limit of the ratio is preferably 0.1 or more.

The molar substitution 2-position MS of hydroxypropyl group by which the hydrogen atom of the hydroxyl group on the 2-position carbon of each glucose unit has been directly replaced, specifically means that the hydrogen atom of the hydroxyl group on the 2-position carbon, among three substitutable hydroxyl groups in each glucose unit, has been replaced by hydroxypropyl or methoxypropyl group. In other words, the 2-position MS specifically means a total of the following degrees of substitution: (1) a degree of substitution of hydroxypropyl or methoxypropyl group by which the hydrogen atom of the hydroxyl group on the 2-position carbon has been replaced, while the hydrogen atom of the hydroxyl group on the 3-position carbon and that on the 6-position carbon have been replaced by methyl groups; (2) a degree of substitution of hydroxypropyl or methoxypropyl group by which the hydrogen atom of the hydroxyl group on the 2-position carbon has been replaced, while the hydrogen atom of the hydroxyl group on the 3-position carbon has been replaced by a methyl group and the hydrogen atom of the hydroxyl group on the 6-position carbon has been unsubstituted; (3) a degree of substitution of hydroxypropyl or methoxypropyl group by which the hydrogen atom of the hydroxyl group on the 2-position carbon has been replaced, while the hydrogen atom of the hydroxyl group on the 6-position carbon has been replaced by a methyl group and the hydrogen atom of the hydroxyl group on the 3-position carbon has been unsubstituted; and (4) a degree of substitution of hydroxypropyl or methoxypropyl group by which the hydrogen atom of the hydroxyl group on the 2-position carbon has been replaced, while the hydrogen atom of the hydroxyl group on the 3-position carbon and that on the 6-position carbon have been unsubstituted.

On the other hand, the molar substitution 3-position MS of hydroxypropyl groups by which the hydrogen atom of the hydroxyl group on the 3-position carbon of each glucose unit has been directly replaced, specifically means that the hydrogen atom of the hydroxyl group on the 3-position carbon, among three substitutable hydroxyl groups of each glucose unit, has been replaced by hydroxypropyl or methoxypropyl group. In other words, the 3-position MS specifically means a total of the following degrees of substitution: (1) a degree of substitution of hydroxypropyl or methoxypropyl group by which the hydrogen atom of the hydroxyl group on the 3-position carbon has been replaced, while the hydrogen atom of the hydroxyl group on the 2-position carbon and that on the 6-position carbon have been replaced by methyl groups; (2) a degree of substitution of hydroxypropyl or methoxypropyl group by which the hydrogen atom of the hydroxyl group on the 3-position carbon has been replaced, while the hydrogen atom of the hydroxyl group on the 2-position carbon has been replaced by a methyl group and the hydrogen atom of the hydroxyl group on the 6-position carbon has been unsubstituted; (3) a degree of substitution of hydroxypropyl or methoxypropyl group by which the hydrogen atom of the hydroxyl group on the 3-position carbon has been replaced, while the hydrogen atom of the hydroxyl group on the 6-position carbon has been replaced by a methyl group and the hydrogen atom of the hydroxyl group on the 2-position carbon has been unsubstituted; and (4) a degree of substitution of hydroxypropyl or methoxypropyl group by which the hydrogen atom of the hydroxyl group on the 3-position carbon has been replaced, while the hydrogen atom of the hydroxyl group on the 2-position carbon and that on the 6-position carbon have been unsubstituted.

The molar substitution 2-position MS of hydroxypropyl group by which the hydrogen atom of the hydroxyl group on the 2-position carbon of each glucose unit has been directly replaced and the molar substitution 3-position MS of hydroxypropyl group by which the hydrogen atom of the hydroxyl group on the 3-position carbon of each glucose unit has been replaced, are measured by the HPMC substitution position analysis as described in Macromolecules, 20, 2413(1987) or Journal of Fiber Science and Technology, 40, T-504(1984), subsequently to deacylation (deacylation method) of HPMCAS as described in WO2013/154607.

The deacylation of the HPMCAS is carried out by the method comprising the steps, in this order, of: dissolving 10 mg of the HPMCAS in 4 mL of dimethylsulfoxide (DMSO) in a nitrogen atmosphere with stirring at 90° C. for 2 hours; adding 200 mg of sodium hydroxide powder thereto and stirring the resulting mixture in a nitrogen atmosphere for 45 minutes; adding 500 µL of water thereto and stirring at 60° C. for one hour; further adding 2.5 mL of water thereto and stirring the resulting mixture overnight at 60° C.; dialyzing the mixture for 2 days with a dialysis tube (product of Fisher Scientific, made of a regenerated cellulose, tubing type of T1, and cut-off molecular weight of 3500); and freeze-drying the content of the tube after dialysis to obtain hydroxypropyl methyl cellulose having acetyl and succinyl groups removed for deacylation.

Next, the HPMC substitution position analysis will be described. The HPMC substitution position analysis comprises the steps, in this order, of: subjecting 50 mg of the above deacylated hydroxypropyl methyl cellulose to addition of 2 mL of a 3% by weight aqueous sulfuric acid solution and hydrolysis at 140° C. for 3 hours; adding about 0.7 g of barium carbonate thereto for neutralization; adding 3 mL of methanol thereto to dissolve the resulting hydrolysate to obtain a dispersion; subjecting the dispersion to centrifugation at 500G to obtain a supernatant; filtering the supernatant through a filter having 0.45-µm openings to obtain a filtrate; subjecting the filtrate to addition of 120 µL of solution obtained by dissolving 1.5 g of $NaBH_4$ in 10 mL of 0.2N aqueous NaOH solution, and the glucose ring reduction at 37 to 38° C. for one hour; adding 100 µL of acetic acid thereto; removing the solvent from the resulting mixture to dryness; adding 1 mL of pyridine and 0.5 mL of acetic anhydride thereto and subjecting the resulting mixture to acetylation at 120° C. for 1.5 hours; subjecting the acetylated product to centrifugation at 500G to obtain a supernatant; filtering the supernatant through a filter having 0.45-µm openings to obtain a filtrate; removing the solvent from the filtrate again; re-dissolving the residue in 1 mL of diethylene glycol dimethyl ether; and injecting 1 µL of the resulting solution into a DB-5 column of J & W Co. heated to from 150 to 280° C. to obtain a retention time and a peak area of each decomposed component using an FID detector so that a ratio of 2-position MS to 3-position MS is calculated wherein the 2-position MS means a molar substitution of hydroxypropyl group by which a hydrogen atom of a hydroxyl group on 2-position carbon of each glucose unit has been directly replaced, and the 3-position MS means a molar substitution of hydroxypropyl group by which a hydrogen atom of a hydroxyl group on 3-position carbon of each glucose unit has been directly replaced. Each detected peak is identified on basis of the structure of each decomposed component which has been analyzed by a mass analyzer beforehand.

The molar substitution of a methyl group of the HPMCAS is not particularly limited. It is preferably from 0.70 to 2.90, more preferably from 1.00 to 2.40, still more preferably from 1.4 to 2.0.

The molar substitution of a hydroxypropyl group of the HPMCAS is not particularly limited. It is preferably from 0.20 to 1.50, more preferably from 0.20 to 1.0, still more preferably from 0.20 to 0.80.

The molar substitution of an acetyl group of the HPMCAS is not particularly limited. It is preferably from 0.10 to 2.50, more preferably from 0.10 to 1.00, still more preferably from 0.40 to 0.95.

The molar substitution of a succinyl group of the HPMCAS is not particularly limited. It is preferably from 0.10 to 2.50, more preferably from 0.10 to 1.00, still more preferably from 0.10 to 0.60.

The content of each substituent of the HPMCAS including the hydroxypropyl group and the other groups may be measured using a method described under the heading of "hypromellose acetate succinate", official monographs, Supplement I of the Japanese Pharmacopoeia 16th Edition.

The viscosity at 20° C. of a dilute (0.1 mol/L) aqueous sodium hydroxide solution containing 2% by weight of the HPMCAS is preferably from 1.1 to 20 mPa·s, more preferably from 1.5 to 3.6 mPa·s. When the viscosity is less than 1.1 mPa·s, the mist generated during spray coating may become small so that the recovery percentage may be reduced. When the viscosity is more than 20 mPa·s, an increase in viscosity of the liquid composition may markedly deteriorate the productivity during spray coating. The viscosity may be measured by the method described in General Tests of HPMCAS in the Japanese Pharmacopoeia 16th Edition.

In the alkali-neutralized aqueous coating method used ordinarily for aqueous coating, the transmittance of aqueous alkali solution of HPMCAS, for example, the transmittance of aqueous alkali solution of HPMCAS obtained by dissolving the HPMCAS in aqueous ammonia to have an HPMCAS concentration of 10% by weight is preferably 70% or more, more preferably 75% or more, still more preferably 78% or more from the standpoint of reducing the amount of undissolved and semi-dissolved materials.

Examples of the aqueous alkali solution include aqueous ammonia, an aqueous monoethanolamine solution, and an aqueous sodium hydroxide solution. The aqueous alkali solution is preferably aqueous ammonia. The concentration of the aqueous alkali solution may be appropriately selected in accordance with the concentration of a carboxyl group. The aqueous alkali solution is preferably added in such an amount that the neutralization degree of the HPMCAS described later becomes preferably 80 mol % or more, more preferably from 95 to 105 mol %.

The transmittance of aqueous alkali solution of HPMCAS is measured by the method comprising the steps of: adding the HPMCAS to the aqueous alkali solution to have an HPMCAS concentration of 10% by weight while stirring with a propeller-type stirrer at about 400 rpm and then continuously stirring the resulting mixture for 3 hours to obtain an aqueous alkali solution containing the HPMCAS at a concentration of 10% by weight; and measuring the transmittance of the obtained aqueous alkali solution adjusted to 20° C. with a transmittance-measuring apparatus (photoelectric colorimeter "PC-50", product of Kotaki Manufacturing Co.) equipped with a 720-nm filter and a 20-mm cell.

A composition comprising the HPMCAS and a solvent is used, for example, as a coating composition for coating a drug. Examples of the coating composition comprising the HPMCAS and a solvent include an alkali-neutralized aqueous coating composition in which the HPMCAS is partially neutralized with an aqueous alkali solution. The HPMCAS is an enteric base and contains carboxyl groups which prevent the HPMCAS from dissolving in an acidic liquid. The alkali-neutralized aqueous coating composition can be obtained by adding an aqueous alkali solution to the HPMCAS in an amount necessary for partially neutralizing the carboxyl groups of the HPMCAS and stirring for preferably about 30 minutes to allow the reaction of the HPMCAS with the alkali to proceed sufficiently.

The type and the concentration of the aqueous alkali solution are same as those used for the above-described measurement of transmittance. In particular, an aqueous ammonia is preferred from the standpoint of almost no alkali salt residue because of ammonia removal due to evaporation of ammonia in a drying step of a coating procedure.

The alkali-neutralized aqueous coating composition may be obtained by the method comprising the steps of: adding the HPMCAS to purified water for dispersing to obtain a mixture; and dispersing while subjecting the mixture to the above-described partial neutralization; wherein propeller stirring or a homogenizer is used for both steps of dispersing. During dispersing, the object liquid is stirred relatively mildly to prevent the stirring from generating air bubbles and agglomeration of the HPMCAS. The revolution speed in propeller stirring is preferably from 100 to 1200 rpm. The revolution speed in homogenizer is preferably from 500 to 10000 rpm.

The neutralization degree of HPMCAS with the aqueous alkali solution means a ratio of an actually added amount of an alkali to an amount of the alkali required for completely (i.e. 100%) neutralizing the carboxyl groups of the HPMCAS. The ratio is calculated using the following equation:

neutralization degree (unit: mol %)={100×(added amount of alkali)/(amount of the alkali required for completely neutralizing the carboxyl groups of HPMCAS)}.

The neutralization degree of HPMCAS with the aqueous alkali solution is preferably 80 mol % or more, more preferably from 95 to 105 mol % based on the carboxyl groups of the HPMCAS. Since the HPMCAS is insoluble in water, an alkali is added to neutralize the HPMCAS for dissolution of the HPMCAS in water to obtain an HPMCAS-containing coating solution. When an alkali is added in an amount equivalent to the amount of the carboxyl groups of HPMCAS to be neutralized, the HPMCAS can theoretically dissolve. However, the HPMCAS sometimes fails to dissolve completely even by the addition of the equivalent amount of alkali. In such a case, the alkali is added further so that the preferable upper limit exceeds 100 mol % and becomes 105 mol %. The term "neutralization degree" as used herein therefore does not mean an actually neutralized degree, but rather means an index amount of an alkali added, compared with the equivalent amount in which the HPMCAS is theoretically neutralized.

When the neutralization degree is less than 80 mol %, dissolution of the HPMCAS may become insufficient. When the neutralization degree is more than 105 mol %, sufficient acid resistance may not be maintained because of enhancement in water introduction due to remaining of an alkali salt. In addition, since the viscosity of the coating composition to be produced depends also on the concentration of the HPMCAS dissolved in the solution, an increase in neutralization degree may limit the concentration of the coating composition which allows coating operation.

The coating composition thus obtained may comprise a pharmaceutically acceptable various type of additive, including a plasticizer such as triacetin and triethyl citrate; a lubricant such as talc and magnesium stearate; a dispersing agent such as sodium lauryl sulfate; a pigment such as titanium oxide and iron oxide; and an anti-foaming agent such as silicone resin.

The viscosity of the coating composition is not particularly limited insofar as the viscosity is within a range to allow spraying to coat the composition. Typically, the viscosity at 20° C. of the coating composition is preferably 200 mPa·s or less, more preferably 100 mPa·s or less, particularly preferably 50 mPa·s or less. The preferable lower limit is 1 mPa·s. When the viscosity is more than 200 mPa·s, it may be difficult to feed the coating solution to a pump and a spray gun so that the smooth coating operation may be disturbed. The viscosity can be measured using a viscosity measurement method described in the Japanese Pharmacopoeia 16th Edition.

The coating composition is used for coating the periphery of a drug-containing core by a conventionally known coating apparatus to produce a solid preparation.

Examples of the solid preparation produced using the coating composition include tablets, granules, fine granules and capsules, and further include orally disintegrating tablets. The solid preparation may comprise, in addition to a drug-containing particle, a various type of additive which can be conventionally used in this field, such as an excipient, a binder, a disintegrant, a lubricant, an anti-aggregation agent and a dissolution adjuvant of a pharmaceutical compound.

Examples of the coating method include a method of applying the coating composition to a drug-containing core.

The coating apparatus is not particularly limited. Examples thereof may include a pan coater, a fluidized bed coater and a tumbling fluidized bed coater.

The composition comprising the HPMCAS and a solvent may not be limited to being used as the coating composition. For example, it is also used in preparation of a solid dispersion. The solid dispersion is prepared by removing the solvent from a solution or dispersion comprising the HPMCAS, a drug and an optional component such as an excipient, a binder, a disintegrant, a lubricant and an anti-aggregation agent. The solvent may be removed, for example, by evaporation to dryness or by spray drying. The term "spray drying" widely means dividing (atomizing) a solution mixture containing a poorly water-soluble drug into small liquid droplets and removing a solvent rapidly from the liquid droplets by evaporation. In a preferable embodiment, for example, the liquid droplets are mixed with a high-temperature drying gas, or the pressure in a solvent removal apparatus is maintained to be a partial vacuum.

Examples of the solvent to be used in preparation of the solid dispersion include acetone, methanol, ethanol, isopropanol, methyl acetate, ethyl acetate, tetrahydrofuran, dichloromethane and mixtures thereof. Acetone is particularly preferred from the standpoint of solubility or dispersibility.

Next, a method for producing the HPMCAS according to the invention will be described.

First, alkali cellulose is obtained, for example, by impregnating a predetermined amount of pulp with an alkali metal hydroxide solution such as an aqueous sodium hydroxide solution.

The pulp to be used in the invention is the same as a usual raw material for cellulose ether such as wood pulp or linter pulp. The pulp may be used in any form such as powder, sheet or chip form. The polymerization degree of the pulp can be appropriately selected depending on the intended viscosity of cellulose ether.

Then the alkali cellulose is reacted with a required amount of a methyl etherifying agent such as methyl chloride and a required amount of a hydroxypropyl etherifying agent such as propylene oxide to produce hydroxypropyl methyl cellulose.

Each glucose unit of cellulose has three substitutable hydroxyl groups. In general, with respect to the methyl etherification, the reactivity is highest at the hydroxyl group on the 2-position carbon of the glucose unit, the reactivity is inferior thereto at the hydroxyl group on the 6-position carbon; and the reactivity is lowest at the hydroxyl group on the 3-position carbon. With respect to the hydroxypropyl etherification, the reactivity is highest at the hydroxyl group on the 6-position carbon of the glucose unit, the reactivity is inferior thereto at the hydroxyl groups on the 2- and 3-position carbons, where the reactivity at the hydroxyl group on the 2-position carbon and that at the hydroxyl group on the 3-position carbon are on the same level. In order to suppress hydroxypropyl etherification of the hydroxyl group on the 2-position carbon, and preferentially advance hydroxypropyl etherification of the hydroxyl group on the 3-position carbon for producing the hydroxypropyl methyl cellulose having a ratio of 2-position MS to 3-position MS of 1.2 or less, the reaction with the hydroxypropyl etherifying agent is preferably preceded by the reaction with the methyl etherifying agent, wherein the 2-position MS means a molar substitution of hydroxypropyl group by which a hydrogen atom of a hydroxyl group on the 2-position carbon of each glucose unit has been directly replaced, and the 3-portion MS means a molar substitution of hydroxypropyl group by which a hydrogen atom of a hydroxyl group on the 3-position carbon of each glucose unit has been directly replaced.

Preferably, a preceding reaction with the methyl etherifying agent is carried out. The methyl etherifying agent and the hydroxypropyl etherifying agent may be added simultaneously, or either one of the methyl etherifying agent and the hydroxypropyl etherifying agent may be added first. It is preferable to produce the intended product while feeding the methyl etherifying agent or hydroxypropyl etherifying agent continuously or discontinuously in such a manner that the reaction ratio of hydroxypropyl etherifying agent is 40% or less, preferably more than 0% but not more than 40% at the time when the reaction ratio of methyl etherifying agent is 30%; or the reaction ratio of hydroxypropyl etherifying agent is 90% or less, preferably more than 0% but not more than 90% at the time when the reaction ratio of methyl etherifying agent is 50%. The term "reaction ratio of methyl etherifying agent" means a molar ratio of the reacted amount of methyl etherifying agent to the stoichiometric amount of methyl etherifying agent at a certain time. For example, when methyl chloride is used, the reaction with the methyl chloride consumes an equimolar amount of an alkali so that the reaction ratio of methyl chloride means a mole ratio of a presently reacted amount of the methyl chloride to an initial alkali amount in a reactor. When the methyl etherification is carried out by using a methyl etherifying agent and an alkali, an amount of the methyl etherifying agent is generally equal to or more than the amount stoichiometric to the amount of the alkali to increase the efficiency of the methyl etherification. According to the definition of the reaction ratio of methyl etherifying agent, even if the methyl etherifying agent is added in an amount stoichiometric to the amount of the alkali or higher in total, an excess amount of the methyl etherifying agent has no effect on calculation of the reaction ratio. Similarly but slightly differently, the term "reaction ratio of hydroxypropyl etherifying agent" means a molar ratio of the reacted amount of hydroxypropyl etherifying agent to the total amount of hydroxypropyl etherifying agent to be added into the reactor at a certain time. Although the methyl etherification can take the amount of the alkali as a criterion of a stoichiometric amount, the hydroxypropyl etherification takes the total amount of the hydroxypropyl etherifying agent added to the reactor as a criterion of the stochiometic amount. It is because the alkali works as a catalyst in the hydroxypropyl etherification and is not consumed in a stoichiometric manner.

The reaction ratio of methyl etherifying agent or the reaction ratio of hydroxypropyl etherifying agent may be determined using a method comprising the step of removing and recovering the methyl etherifying agent or hydroxypropyl etherifying agent quickly from the reactor to determine the amount of the methyl etherifying agent or hydroxypropyl etherifying agent present in the reactor just before the removal and recovery, wherein the reaction ratio is calculated by dividing the reacted amount of methyl etherifying agent by the stoichiometric amount or dividing the reacted amount of hydroxypropyl etherifying agent by the total amount of hydroxypropyl etherifying agent to be added into the reactor. The reaction ratios may also be determined using simulation based on chemical reaction rate equations found by an experiment.

By carrying out a preceding reaction with the methyl etherifying agent, the reaction efficiency of competitive etherification with the hydroxypropyl etherifying agent decreases so that the reaction ratio of hydroxypropyl etherifying agent at the time when the reaction ratio of methyl etherifying agent is 30% or 50% can be used as an index of the preceding reaction with the methyl etherifying agent.

The methyl etherifying agent is fed for preferably from 5 to 80 minutes, more preferably from 5 to 50 minutes. The hydroxypropyl etherifying agent is fed for preferably from 10 to 90 minutes, more preferably from 30 to 90 minutes. However, it is noted that the feed time of the methyl etherifying agent does not contain a time lag between the start of feeding of the hydroxypropyl etherifying agent and the start of feeding of the methyl etherifying agent; and that the feed time of the hydroxypropyl etherifying agent does not contain a time lag between the start of feeding of the methyl etherifying agent and the start of feeding of the hydroxypropyl etherifying agent.

By carrying out the production while feeding the methyl etherifying agent or the hydroxypropyl etherifying agent continuously or discontinuously, the reaction ratio of hydroxypropyl etherifying agent becomes 40% or less at the time when the reaction ratio of methyl etherifying agent is 30%, or the reaction ratio of the hydroxypropyl etherifying agent becomes 90% or less at the time when the reaction ratio of the methyl etherifying agent is 50%. As a result, there can be produced the hydroxypropyl methyl cellulose having a ratio of 2-position MS to 3-position MS of 1.2 or less wherein the 2-position MS means a molar substitution of hydroxypropyl group by which a hydrogen atom of a hydroxyl group on the 2-position carbon of each glucose unit has been directly replaced, and the 3-position MS means a molar substitution of hydroxypropyl group by which a hydrogen atom of a hydroxyl group on the 3-position carbon of each glucose unit has been directly placed.

The etherification reaction temperature is not particularly limited insofar as the reaction ratio of the hydroxypropyl etherifying agent at the time when the reaction ratio of the methyl etherifying agent is 30% or 50% falls within the above-mentioned range. In a preferable embodiment, the temperature is in a range of from 50 to 80° C. at the initial stage of the reaction (at the time when feeding of either of the etherifying agents is started), also in the range of from 50 to 80° C. at 0.5 hour later, in the range of from 55 to 90° C. at 1 hour later, in the range of from 65 to 110° C. at 1.5 hours later, and in the range of from 80 to 110° C. at 2 hours later. The temperature thereafter is preferably kept at from 80 to 110° C. The reaction may be terminated when the etherification reaction is completed irrespective of the above-described schedule.

According to the invention, the hydroxypropyl methyl cellulose can be produced under conditions similar to those of a known method except for the reaction ratio of hydroxypropyl etherifying agent at the time when the reaction ratio of the methyl etherifying agent is 30% or is 50%.

The hydroxypropyl methyl cellulose obtained above can be used, for example, as a coating composition after being subjected to an optional depolymerization reaction for viscosity adjustment. The depolymerization reaction may be carried out by the method described in Japanese Patent Application Examined Publication No. 4-076361. In other words, the depolymerization reaction may be carried out by the method comprising the steps of: bringing the hydroxypropyl methyl cellulose into contact with an aqueous hydrogen chloride solution for the reaction at a temperature of 40 to 85° C. in such an amount that hydrogen chloride becomes from 0.1 to 1% by weight of the amount of the hydroxypropyl methyl cellulose and a water content in the reaction system becomes from 3 to 8% by weight; and then removing the hydrogen chloride. The viscosity at 20° C. of a 2% by weight aqueous hydroxypropyl methyl cellulose solution after the depolymerization reaction is measured in accordance with the viscosity measurement by capillary tube viscometer described in the Japanese Pharmacopoeia 16th Edition. It is preferably from 1.2 to 30 mPa·s, more preferably from 1.6 to 4.5 mPa·s.

The HPMCAS may be produced using the hydroxypropyl methyl cellulose as a starting material in accordance with, for example, the method described in Japanese Patent Application Unexamined Publication No. 54-061282A. The method comprises the steps of: subjecting the hydroxypropyl methyl cellulose dissolved in glacial acetic acid to addition of acetic anhydride and succinic anhydride as esterifying agents and addition of sodium acetate as a reaction catalyst, while heating for the reaction; adding a large amount of water to the reaction mixture to allow HPMCAS to precipitate after completion of the reaction; washing the resulting precipitate with water; and drying the washed precipitate. When the hydroxypropyl methyl cellulose having a ratio of 2-position MS to 3-position MS of 1.2 or less is used as a starting material, the resulting HPMCAS also has a ratio of 2-position MS to 3-position MS of 1.2 or less, wherein the 2-position MS means a molar substitution of hydroxypropyl group by which a hydrogen atom of a hydroxyl group on the 2-position carbon of each glucose unit has been directly replaced, and the 3-position MS means a molar substitution of hydroxypropyl group by which a hydrogen atom of a hydroxyl group on the 3-position carbon of each glucose unit has been directly replaced.

EXAMPLES

The invention will be described specifically by Examples and Comparative Examples. It should not be construed that the invention is limited to or by Examples.

Example 1

After high-purity dissolving pulp derived from wood was impregnated with a 49% by weight aqueous NaOH solution of 50° C. for 12 seconds so that a weight ratio of the 49% by weight aqueous NaOH solution to a solid component in the pulp (49% by weight aqueous NaOH solution/solid component in pulp) became 100, and then pressed for removal of excess 49% by weight aqueous NaOH solution to obtain alkali cellulose. A weight ratio of NaOH in the obtained alkali cellulose to the solid component in the pulp (NaOH/solid component in pulp) was found to be 1.20.

The 2029 g of the alkali cellulose (containing 570 g of cellulose portion) was placed in a pressure vessel (i.e. reactor) equipped with a plow share type internal stirring blade. The reactor was vacuumed to −97 kPa, and then purged with nitrogen to return to the atmospheric pressure. Then the reactor was vacuumed again to −97 kPa.

Next, 1127 g of methyl chloride was fed into the reactor with a pressure pump in 30 minutes. Simultaneously with the start of feeding of the methyl chloride, feeding of propylene oxide into the reactor started with a pressure pump, and 491 g of the propylene oxide was fed into the reactor in 50 minutes. The inside temperature of the reactor was adjusted to from 50 to 80° C. at the start, a range of from 50 to 80° C. at 0.5 hour later, a range of from 55 to 90° C. at one hour later, a range of from 65 to 110° C. at 1.5 hours later, and a range of from 80 to 110° C. at two hours later, to complete the etherification reaction. In a test performed separately for sampling under the same conditions, the reaction ratio of propylene oxide was 25.5% at the time when the reaction ratio of methyl chloride was 30%, and the reaction ratio of propylene oxide was 36% at the time when the reaction ratio of methyl chloride was 50%.

The reaction product was washed with hot water of 95° C. or more and then dried using a small-sized Wiley mill. The hydroxypropyl methyl cellulose thus obtained had an average degree of substitution (DS) of methyl groups of 1.89 and molar substitution (MS) of hydroxypropyl groups of 0.24 as a result of analyses in accordance with the method of analyzing the degree of substitution of hypromellose (hydroxypropyl methyl cellulose) in the Japanese Pharmacopoeia 16th Edition.

The 450 g of the hydroxypropyl methyl cellulose was placed in a 10-L Henschel mixer and mixed at 200 rpm, while spraying an aqueous hydrochloric acid having a concentration of 10% by weight thereto in such an amount that 3 g of hydrogen chloride component became added thereto. The resulting mixture was transferred into a 2-L glass reactor, and subjected to a depolymerization reaction until the viscosity at 20° C. of a 2% by weight aqueous solution became 3.4 mPa·s while rotating the reactor in a water bath of 75° C. Then hydrogen chloride and water were evaporated for 30 minutes under reduced pressure of 80 mmHg to obtain the depolymerized hydroxypropyl methyl cellulose.

Next, 400 g of the depolymerized hydroxypropyl methyl cellulose, 640 g of glacial acetic acid, 81 g of succinic anhydride and 227 g of acetic anhydride were placed in a 5-L kneader type reactor equipped with a twin screw stirrer, and reacted in the presence of 193 g of sodium acetate at 85° C. for 5 hours. The 450 g of purified water was added thereto, and the resulting mixture was stirred and then subjected to addition of purified water to allow HPMCAS to precipitate in granular form. The precipitate was filtered to collect crude HPMCAS. The crude HPMCAS was washed with purified water, dried, and then sieved through a 10-mesh sieve having openings of 1700 μm to obtain HPMCAS having a final water content of 1.2% by weight.

Next, a ratio of 2-position MS to 3-position MS of the HPMCAS was determined, wherein the 2-position MS means a molar substitution of hydroxypropyl group by which a hydrogen atom of a hydroxyl group on the 2-position carbon of each glucose unit has been replaced, and the 3-position MS means a molar substitution of hydroxypropyl group by which a hydrogen atom of a hydroxyl group on the 3-position carbon of each glucose unit has been replaced. First, the HPMCAS was deacylated by the HPMCAS deacylation method and then subjected to the HPMC substitution position analysis to find the ratio of 2-position MS to 3-position MS. The ratio was found to be 0.65.

The transmittance of the HPMCAS was measured using an aqueous ammonia solution having the HPMCAS dissolved therein. The aqueous ammonia solution of the HPMCAS is prepared as follows. The HPMCAS (26 g) was dispersed in 228.8 g of purified water at room temperature while stirring at a rate of 400 rpm with a propeller type stirrer to obtain an aqueous HPMCAS suspension. The resulting suspension was subjected to addition of 5.21 g of a 10% by weight aqueous ammonia solution while stirring with the propeller type stirrer, to neutralize 100 mol % of the carboxyl groups of the HPMCAS. Stirring was continued for further 3 hours to prepare an aqueous ammonia solution of 20° C. having the HPMCAS concentration of 10% by weight. The transmittance of the aqueous ammonia solution of the HPMCAS was measured using a transmittance measurement apparatus (photoelectric colorimeter "PC-50", product of Kotaki Manufacturing Co.) equipped with a 720-nm filter and a 20-mm cell. The results are shown in Table 1.

Example 2

HMPCAS was obtained in the same manner as in Example 1 except that the feed time of methyl chloride was 34 minutes and the amount of propylene oxide fed was 445 g. The results are shown in Table 1.

Example 3

HMPCAS was obtained in the same manner as in Example 1 except that the feed time of methyl chloride was 50 minutes, the feed time of propylene oxide was 33 minutes, and the amount of propylene oxide fed was 348 g. The results are shown in Table 1.

Example 4

HMPCAS was obtained in the same manner as in Example 1 except that the feed time of methyl chloride was 80 minutes, the feed time of propylene oxide was 10 minutes, and the amount of propylene oxide fed was 268 g. The results are shown in Table 1.

Example 5

HMPCAS was obtained in the same manner as in Example 1 except that the feed time of methyl chloride was 80 minutes, the feed time of propylene oxide was 10 minutes, the amount of propylene oxide fed was 268 g, and feeding of methyl chloride was started 10 minutes after feeding of propylene oxide was started. The results are shown in Table 1.

Comparative Example 1

HMPCAS was obtained in the same manner as in Example 1 except that the feed time of methyl chloride was 80 minutes, the feed time of propylene oxide was 10 minutes, the amount of propylene oxide fed was 268 g, and feeding of methyl chloride was started 15 minutes after feeding of propylene oxide was started. The results are shown in Table 1.

Comparative Example 2

HMPCAS was obtained in the same manner as in Example 1 except that the feed time of methyl chloride was 80 minutes, the feed time of propylene oxide was 10 minutes, the amount of propylene oxide fed was 268 g, and feeding of methyl chloride was started 20 minutes after feeding of propylene oxide was started. The results are shown in Table 1.

Comparative Example 3

HMPCAS was obtained in the same manner as in Example 1 except that the feed time of methyl chloride was 80 minutes, the feed time of propylene oxide was 10 minutes, the amount of propylene oxide fed was 268 g, and feeding of methyl chloride was started 27 minutes after feeding of propylene oxide was started. The results are shown in Table 1.

Each HPMCAS of Examples 1 to 5 having a ratio of 2-position MS to 3-position MS of 1.2 or less exhibits the transmittance as high as about 75%, wherein the 2-position ratio means a molar substitution of hydroxypropyl group by which a hydrogen atom of a hydroxyl group on the 2-position carbon of each glucose unit has been replaced, and the 3-position MS means a molar substitution of hydroxypropyl group by which a hydrogen atom of a hydroxyl group on the 3-position carbon of each glucose unit has been replaced. On the other hand, each HPMCAS of Comparative Examples 1 to 3 having a ratio of 2-position MS to 3-position MS of more than 1.2 exhibits a relatively low transmittance with very turbid appearance. It is evident that since the ratio of 2-position MS to 3-position MS of HPMCAS is lowered, the solubility of HPMCAS is increased.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

That which is claimed is:

1. A method for producing hypromellose acetate succinate comprising the steps of:
   reacting pulp with an alkali to obtain alkali cellulose;
   reacting the alkali cellulose with a methyl etherifying agent and a hydroxypropyl etherifying agent to obtain hydroxypropyl methyl cellulose in such a manner that

TABLE 1

| | amount fed | | | feed time | | start of feeding of methyl chloride *1 (min) | reaction ratio of propylene oxide at 30% *2 (%) | reaction ratio of propylene oxide at 50% *3 (%) |
|---|---|---|---|---|---|---|---|---|
| | pulp (g) | methyl chloride (g) | propylene oxide (g) | methyl chloride (min) | propylene oxide (min) | | | |
| Example1 | 570 | 1127 | 491 | 30 | 50 | 0 | 25.5 | 36.0 |
| Example2 | 570 | 1127 | 445 | 34 | 50 | 0 | 27.7 | 38.0 |
| Example3 | 570 | 1127 | 348 | 50 | 33 | 0 | 32.2 | 53.5 |
| Example4 | 570 | 1127 | 268 | 80 | 10 | 0 | 35.0 | 82.3 |
| Example5 | 570 | 1127 | 268 | 80 | 10 | 11 | 39.7 | 90.0 |
| Comp. Ex. 1 | 570 | 1127 | 268 | 80 | 10 | 15 | 43.5 | 91.6 |
| Comp. Ex. 2 | 570 | 1127 | 268 | 80 | 10 | 20 | 50.8 | 94.5 |
| Comp. Ex. 3 | 570 | 1127 | 268 | 80 | 10 | 27 | 61.1 | 97.0 |

| | molar substitution | | | | ratio of 2-position MS to 3-position MS | transmittance in aq. ammonia solution of HPMCAS *4 (%) |
|---|---|---|---|---|---|---|
| | methoxy group | hydroxypropoxy group | acetyl group | succinyl group | | |
| Example1 | 1.89 | 0.24 | 0.55 | 0.32 | 0.65 | 78.3 |
| Example2 | 1.89 | 0.24 | 0.54 | 0.32 | 0.77 | 75.4 |
| Example3 | 1.89 | 0.24 | 0.55 | 0.31 | 0.92 | 75.2 |
| Example4 | 1.89 | 0.24 | 0.54 | 0.32 | 1.10 | 75.2 |
| Example5 | 1.89 | 0.24 | 0.55 | 0.32 | 1.20 | 73.9 |
| Comp. Ex. 1 | 1.89 | 0.24 | 0.56 | 0.32 | 1.29 | 66.2 |
| Comp. Ex. 2 | 1.89 | 0.24 | 0.54 | 0.32 | 1.53 | 62.5 |
| Comp. Ex. 3 | 1.89 | 0.24 | 0.55 | 0.31 | 1.87 | 59.5 |

*1 The start of feeding of methyl chloride is expressed as delay time from the start of feeding of propylene oxide.
*2 It shows the reaction ratio of propylene oxide at the time when the reaction ratio of methyl chloride was 30%.
*3 It shows the reaction ratio of propylene oxide at the time when the reaction ratio of methyl chloride was 50%.
*4 The ammonia concentration of the aqueous ammonia solution was 10% by weight.

a reaction ratio of the hydroxypropyl etherifying agent is 40% or less at the time when a reaction ratio of the methyl etherifying agent is 30%, and the reaction ratio of the hydroxypropyl etherifying agent is 90% or less at the time when the reaction ratio of the methyl etherifying agent is 50%; and reacting the hydroxypropyl methyl cellulose with acetic anhydride and succinic anhydride to obtain the hypromellose acetate succinate having a ratio of 2-position MS to 3-position MS of 1.2 or less, wherein the 2-position MS means a molar substitution of hydroxypropyl group by which a hydrogen atom of a hydroxyl group on 2-position carbon of each glucose unit of the hypromellose acetate succinate has been directly replaced, and the 3-position MS means a molar substitution of hydroxypropyl group by which a hydrogen atom of a hydroxyl group on 3-position carbon of each glucose unit of the hypromellose acetate succinate has been directly replaced.

* * * * *